US010981789B2

United States Patent
Morihara et al.

(10) Patent No.: US 10,981,789 B2
(45) Date of Patent: Apr. 20, 2021

(54) METHOD FOR DRAWING CARBON NANOTUBE WEB, METHOD FOR MANUFACTURING CARBON NANOTUBE YARN, METHOD FOR MANUFACTURING CARBON NANOTUBE SHEET, AND DEVICE FOR DRAWING CARBON NANOTUBE WEB

(71) Applicant: HITACHI ZOSEN CORPORATION, Osaka (JP)

(72) Inventors: Norifumi Morihara, Osaka (JP); Tetsuya Inoue, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 100 days.

(21) Appl. No.: 16/099,480

(22) PCT Filed: May 18, 2017

(86) PCT No.: PCT/JP2017/018691
§ 371 (c)(1),
(2) Date: Nov. 7, 2018

(87) PCT Pub. No.: WO2017/200045
PCT Pub. Date: Nov. 23, 2017

(65) Prior Publication Data
US 2019/0194020 A1 Jun. 27, 2019

(30) Foreign Application Priority Data
May 18, 2016 (JP) .............. JP2016-099880

(51) Int. Cl.
*C01B 32/00* (2017.01)
*B82Y 40/00* (2011.01)
(Continued)

(52) U.S. Cl.
CPC ............ *C01B 32/168* (2017.08); *B82Y 30/00* (2013.01); *B82Y 40/00* (2013.01); *C01B 2202/08* (2013.01)

(58) Field of Classification Search
None
See application file for complete search history.

(56) References Cited

U.S. PATENT DOCUMENTS

2010/0263783 A1* 10/2010 Feng ................. C01B 32/15
156/62.2
2010/0282403 A1 11/2010 Liu et al.
(Continued)

FOREIGN PATENT DOCUMENTS

JP 2009-012176 A 1/2009
JP 2009-091240 A 4/2009
(Continued)

OTHER PUBLICATIONS

English translation of International Search Report of PCT/JP2017/018691 dated Jul. 18, 2017.
(Continued)

*Primary Examiner* — Jacob T Minskey
*Assistant Examiner* — Matthew Hoover
(74) *Attorney, Agent, or Firm* — Pillsbury Winthrop Shaw Pittman LLP

(57) ABSTRACT

The present invention provides a method for further uniformly drawing out a carbon nanotube web while inhibiting mixing of edge scraps. A carbon nanotube web is drawn out from a carbon nanotube array-in a state in which abutting members which abut on the carbon nanotube array are provided on respective outer sides of both edges of a boundary region between the carbon nanotube array and the carbon nanotube web.

6 Claims, 8 Drawing Sheets

(51) Int. Cl.
    *C01B 32/168*     (2017.01)
    *B82Y 30/00*     (2011.01)

(56) References Cited

U.S. PATENT DOCUMENTS

| | | |
|---|---|---|
| 2011/0039075 A1 | 2/2011 | Feng et al. |
| 2011/0120633 A1 | 5/2011 | Liu et al. |
| 2011/0278758 A1 | 11/2011 | Liu et al. |
| 2014/0217643 A1 | 8/2014 | Nikawa et al. |

FOREIGN PATENT DOCUMENTS

| | | |
|---|---|---|
| JP | 2010-248069 A | 11/2010 |
| JP | 2011-037703 A | 2/2011 |
| JP | 2014-169521 A | 9/2014 |
| JP | 2014-237563 A | 12/2014 |
| JP | 2015-067483 A | 4/2015 |
| JP | 2015-138718 A | 7/2015 |
| WO | 2015/080008 A1 | 6/2015 |

OTHER PUBLICATIONS

English translation of International Preliminary Report on Patentability and Written Opinion of the International Searching Authority PCT/JP2017/018691 dated Nov. 20, 2018.
Extended European Search Report dated Dec. 17, 2019 issued in corresponding EP Application No. 17799469.6.

\* cited by examiner

METHOD FOR DRAWING CARBON NANOTUBE WEB, METHOD FOR MANUFACTURING CARBON NANOTUBE YARN, METHOD FOR MANUFACTURING CARBON NANOTUBE SHEET, AND DEVICE FOR DRAWING CARBON NANOTUBE WEB

CROSS-REFERENCE TO RELATED APPLICATIONS

This application is the U.S. National Stage of PCT/JP2017/018691, filed May 18, 2017, which in turn claims priority to Japanese Patent Application No. 2016-099880, filed May 18, 2016. The contents of each of these applications are incorporated herein by reference in entirety.

TECHNICAL FIELD

The present invention relates to a drawing method and a drawing device that draws a carbon nanotube web out from a carbon nanotube array, and to methods for manufacturing a carbon nanotube yarn and a carbon nanotube sheet with use of the drawing method or the drawing device.

BACKGROUND ART

Carbon nanotubes are receiving attention as a material having excellent electrical conductivity, heat conductivity, and mechanical strength, and are increasingly used in various fields. In a case where the carbon nanotubes are utilized, the carbon nanotubes are sometimes formed into a film or a yarn in accordance with their utilization form.

Patent Literature 1 discloses a manufacturing method for obtaining a carbon nanotube film. The manufacturing method includes the following steps:

First step: Grow, on a substrate, a carbon nanotube array including a plurality of carbon nanotubes which are vertically arranged.

Second step: Form at least two grooves, which extend in parallel and are arranged apart from each other, on a surface of the carbon nanotube array which surface is opposite to a surface making contact with the substrate.

Third step: Fix, to a drawing device, ends of a plurality of carbon nanotubes which are included in the carbon nanotube array and are located between adjacent grooves.

Fourth step: Move the drawing device in a length direction of the grooves so as to detach the plurality of carbon nanotubes from the carbon nanotube array, and thus obtain at least one sheet of carbon nanotube film (corresponding to a carbon nanotube web in accordance with the present invention).

The second step of the manufacturing method is carried out in order to define a film width with which the carbon nanotube film is drawn out from the carbon nanotube array. That is, carbon nanotubes in the formed two grooves are disconnected from adjacent carbon nanotubes in an inner side region located between the two grooves. Therefore, in a case where the plurality of carbon nanotubes are drawn out from the inner side region, the carbon nanotubes in the grooves will not be drawn out while being connected with the carbon nanotubes in the inner side region. As a result, according to Patent Literature 1, the carbon nanotube film can be obtained which has a uniform width corresponding to the width defined by the two grooves.

Note that, as a specific example of the method for forming grooves, Patent Literature 1 discloses a laser method in which carbon nanotubes corresponding to a groove are irradiated with a laser beam. According to Patent Literature 1, carbon nanotubes irradiated with a laser beam become shorter in length by being destroyed with energy of the laser beam, and thus form a hollow portion, that is, a groove in a surface of the carbon nanotube array.

CITATION LIST

Patent Literature

Patent Literature 1: Japanese Patent Application Publication, Tokukai, No. 2011-37703 (Publication Date: Feb. 24, 2011)

SUMMARY OF INVENTION

Technical Problem

However, the inventors of the present invention have found that the manufacturing method disclosed in Patent Literature 1 has the following problem.

In the vicinity of the grooves formed with the laser method, a certain amount of carbon nanotubes exist which have been incompletely influenced by the laser beam. Those carbon nanotubes have disturbance in degree of connection with the other carbon nanotubes. Therefore, in a case where a carbon nanotube film is continuously drawn out from the carbon nanotube array, the carbon nanotubes which have been incompletely influenced by the laser beam are not drawn out and remain in the vicinity of the grooves as shown in (a) and (b) of FIG. 8. In such a case, a phenomenon sometimes occurs in which the carbon nanotubes thus remained are mixed, as a lump, in a carbon nanotube film to be drawn out. Note that the remaining or mixed carbon nanotubes are seen as substances such as scraps generated at edges, and are accordingly hereinafter referred to as "edge scraps".

As a result, the edge scraps are unevenly mixed in the carbon nanotube film which is drawn out, and this causes unevenness in physical properties (e.g., electrical conductivity, heat conductivity, mechanical strength) among different portions of the carbon nanotube film.

Note that this problem is common to manufacturing processes (e.g., manufacturing of a carbon nanotube yarn) involving drawing out of carbon nanotubes as in the above fourth step, as well as to the manufacturing of the carbon nanotube film.

The present invention is accomplished as a result of finding the problem and of diligent studies for solving the problem. An object of the present invention is to provide a method for further uniformly drawing out a carbon nanotube web while inhibiting mixing of edge scraps.

Solution to Problem

In order to attain the object, a drawing method for drawing out a carbon nanotube web in accordance with an aspect of the present invention is a method for drawing a web of carbon nanotubes out from an array of carbon nanotubes, the method including: drawing the web out from the array in a state in which abutting members which abut on the array are provided on respective outer sides of both edges of a boundary region between the array and the web.

A drawing device that draws out a carbon nanotube web in accordance with an aspect of the present invention is a drawing device that draws a web of carbon nanotubes out from an array of carbon nanotubes, the drawing device including: a pulling section that pulls the web so as to draw the web out from the array; and abutting members which abut on the array on respective outer sides of both edges of a boundary region between the array and the web.

Advantageous Effects of Invention

An aspect of the present invention brings about an effect of further uniformly drawing out a carbon nanotube web while inhibiting mixing of edge scraps.

Figure 7:
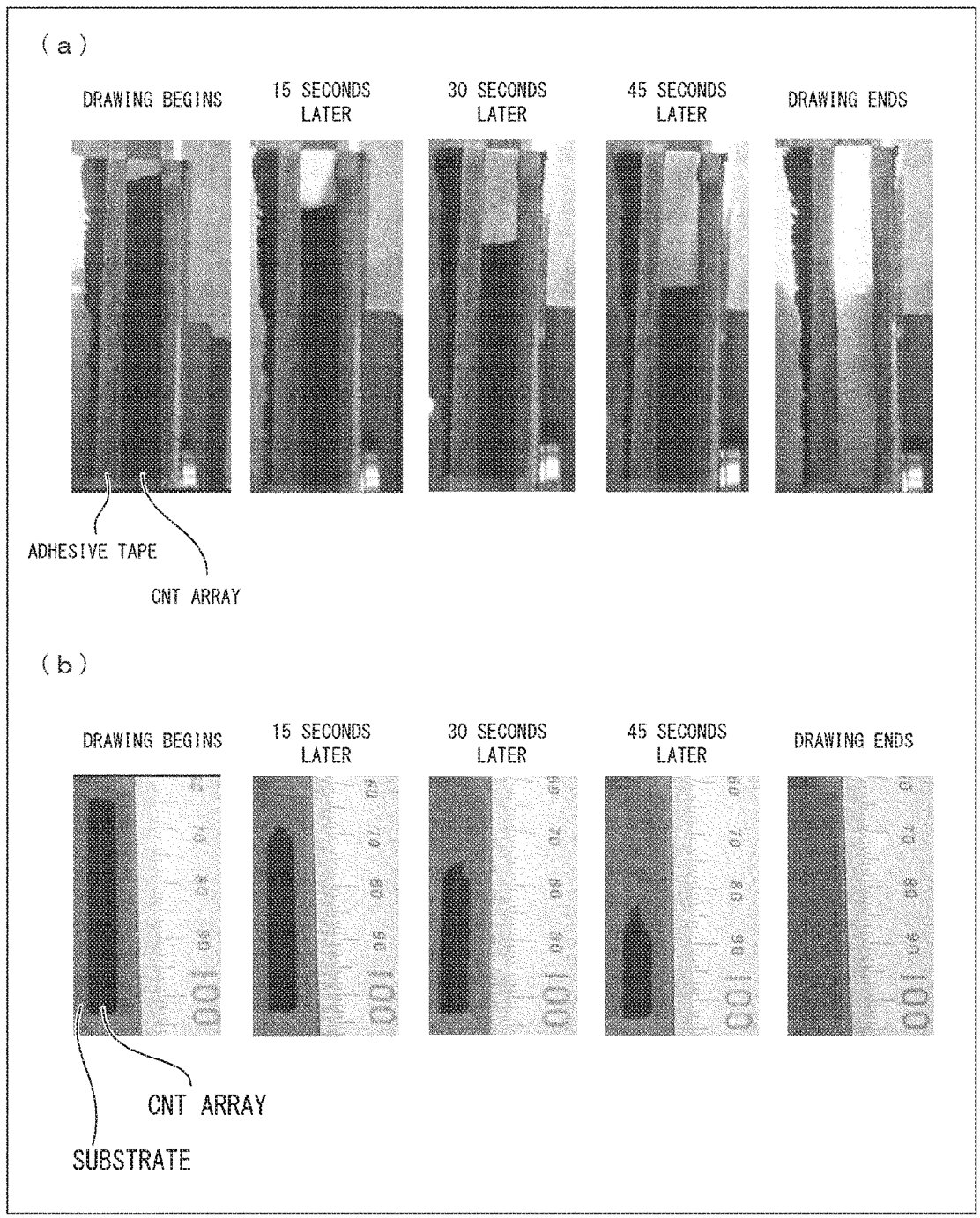

(a) of FIG. 7 is photographs showing a state in which a carbon nanotube web is being drawn out from a carbon nanotube array with a drawing method in Example of the present invention. (b) of FIG. 7 is photographs showing a state in which a carbon nanotube web is being drawn out from a carbon nanotube array with a drawing method in Comparative Example.

Figure 8:
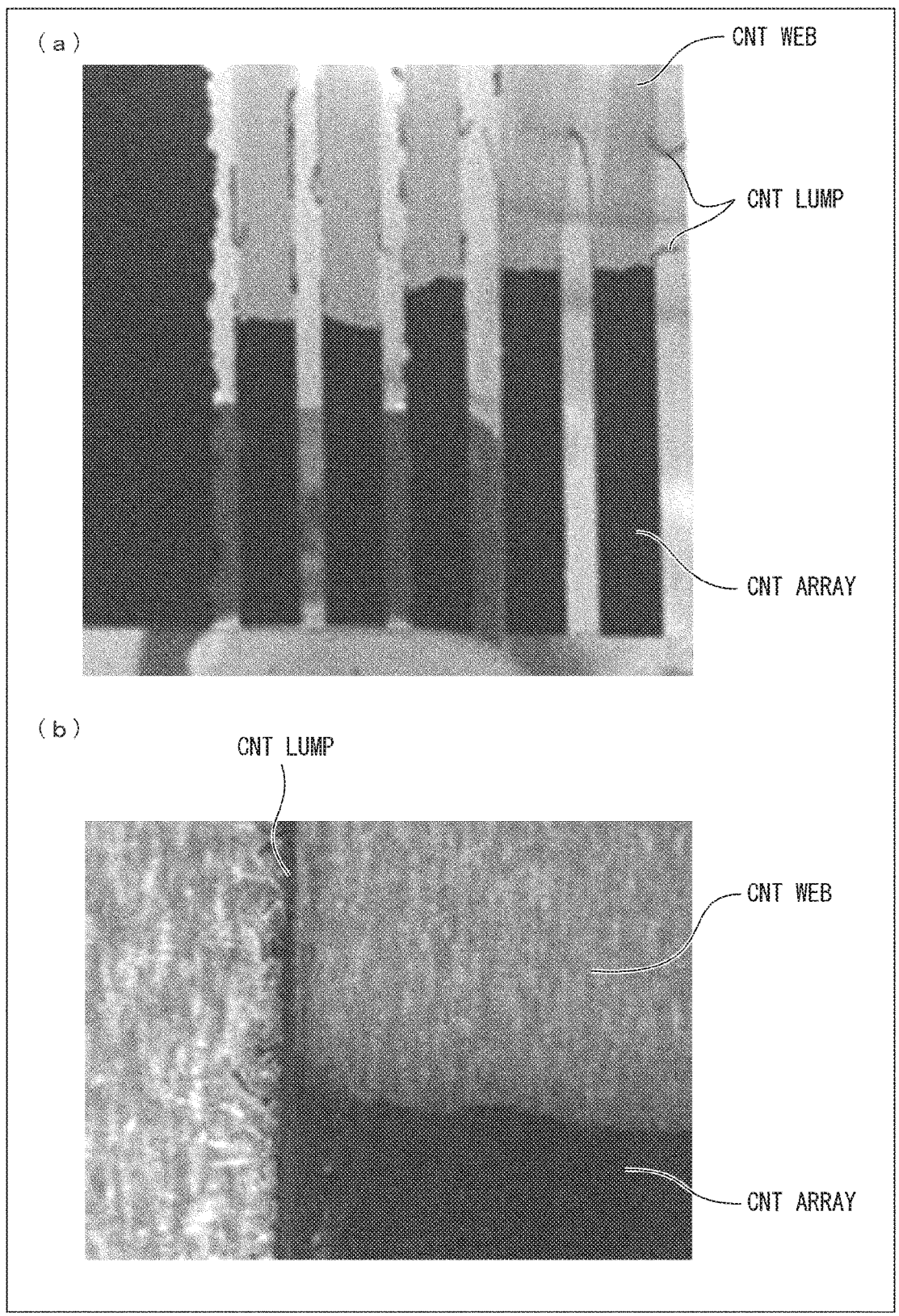

(a) of FIG. 8 is a photograph showing a state in which a carbon nanotube web has been drawn out with a conventional drawing method for drawing out a carbon nanotube web. (b) of FIG. 8 is an enlarged view showing an edge of a boundary region between the carbon nanotube array and the carbon nanotube web shown in (a) of FIG. 8.

DESCRIPTION OF EMBODIMENTS

The following description will discuss details of an embodiment of the present invention.

Carbon Nanotube Array

Figure 1:
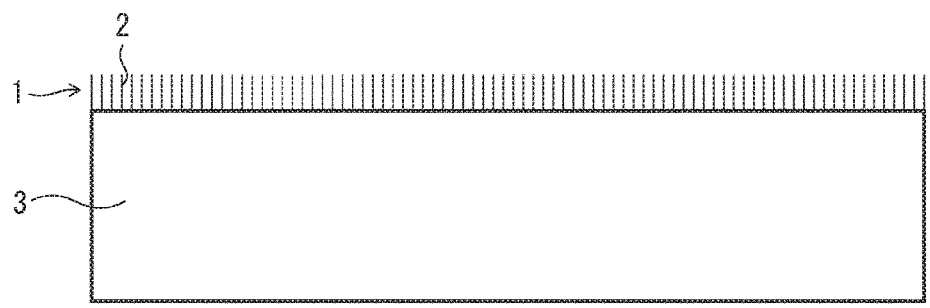
FIG. 1 is a cross-sectional view illustrating a carbon nanotube array used in an embodiment of the present invention.

First, the following description will discuss, with reference to a cross-sectional view of FIG. 1, a carbon nanotube array used in the present embodiment.

Note that the "carbon nanotube array" indicates an aggregate of carbon nanotubes which have grown on a base material such that portions of the carbon nanotubes which portions extend in a long-axis direction are at least partially oriented in a certain direction. Hereinafter, the carbon nanotubes are abbreviated to "CNT", the carbon nanotube array is abbreviated to "CNT array", and the carbon nanotube web is abbreviated to "CNT web".

A CNT array 1 has a configuration in which a plurality of CNTs 2 are provided on a substrate 3 (serving as a base material) such that a long-axis direction of each of the CNTs 2 is oriented in a substantially vertical direction (see FIG. 1). The CNT array 1 is manufactured with a chemical vapor deposition (CVD) method. The following description will discuss a method for manufacturing the CNT array 1.

The CNT array 1 is formed as follows: that is, the substrate 3 having a surface on which a catalyst layer has been provided is placed in a thermal CVD chamber which has been preheated to a predetermined temperature (600° C. to 1000° C.) in advance, and then a gas is fed into the thermal CVD chamber for a predetermined time period.

More specifically, in the present embodiment, a stainless steel substrate is used as the substrate 3. Note, however, that the substrate 3 is not limited to the stainless steel substrate, and it is possible to use, for example, a silicon substrate, a quartz substrate, or the like. In a case where the stainless steel substrate is used as the substrate 3, it is preferable to provide a buffer layer between the substrate 3 and the catalyst layer. This makes it possible to prevent the catalyst layer from being influenced by chromium which is a constituent element of stainless steel. The buffer layer is made of, for example, silica or alumina. Note that the substrate 3 in accordance with the present embodiment is not limited to the plate-like member, provided that the substrate 3 is a base material having a surface for forming the CNT array 1. Accordingly, an example of the substrate 3 encompasses a sheet-like member.

In the present embodiment, the catalyst layer is made of iron (Fe), and is formed with an electron beam (EB) method. Note, however, that the catalyst layer in accordance with the present invention is not limited to Fe and can be made of, for example, cobalt (Co), nickel (Ni), or the like. The catalyst layer in accordance with an aspect of the present invention can be formed with a sputtering method, a vacuum vapor deposition method, or the like.

In the present embodiment, acetylene is used as the gas. Note, however, that the gas in an aspect of the present invention can be any of alkanes such as methane, ethane, propane, or hexane; an unsaturated organic compound such as any of ethylenes or propylene; or an aromatic compound such as benzene or toluene.

In a case where the CNT array 1 is manufactured as above described, each of the CNTs 2 constituting the CNT array 1 in accordance with the present embodiment is formed as a multi-walled CNT which is constituted by 5 to 10 layers and has an outer diameter of 10 nm to 30 nm and a length of 50 µm to 1000 µm. Further, the CNT array 1 is preferably constituted by $10^9$ to $10^{11}$ pieces of the CNTs 2 per square centimeter.

Note that the CNT array used in the present invention is not limited to the above described one. That is, the CNT array used in the present invention only needs to be, as above described, an aggregate of CNTs which have grown on a base material such that portions of the CNTs which portions extend in the long-axis direction are at least partially oriented in a certain direction. The CNT can be, for example, a single-walled CNT or a multi-walled CNT (such as double- to quadruple-walled CNTs, or a CNT constituted by 11 or more layers).

Method for Drawing Out CNT Web

The following description will discuss a method for drawing a CNT web out from a CNT array. Here, the "CNT web" indicates an aggregate of CNTs which are formed, in a reticulate pattern, when some CNTs are pulled out from the CNT array in a certain direction (typically, in a direction along a surface of the base material) and other CNTs are also drawn out together. This phenomenon occurs because each of CNTs constituting the CNT array is bundled with surrounding CNTs by van der Waals forces. Note that, in general, the technique of drawing the CNT web out from the CNT array is sometimes referred to as "CNT spinning".

The method for drawing out the CNT web in accordance with an aspect of the present invention includes drawing the CNT web out from the CNT array in a state in which abutting members which abut on the CNT array are provided on respective outer sides of both edges of a boundary region between the CNT array and the CNT web. The following description will discuss the method for drawing out the CNT web in accordance with the present embodiment, with reference to FIGS. 2 through 4.

Drawing Method (1) for Drawing Out CNT Web

Figure 2:
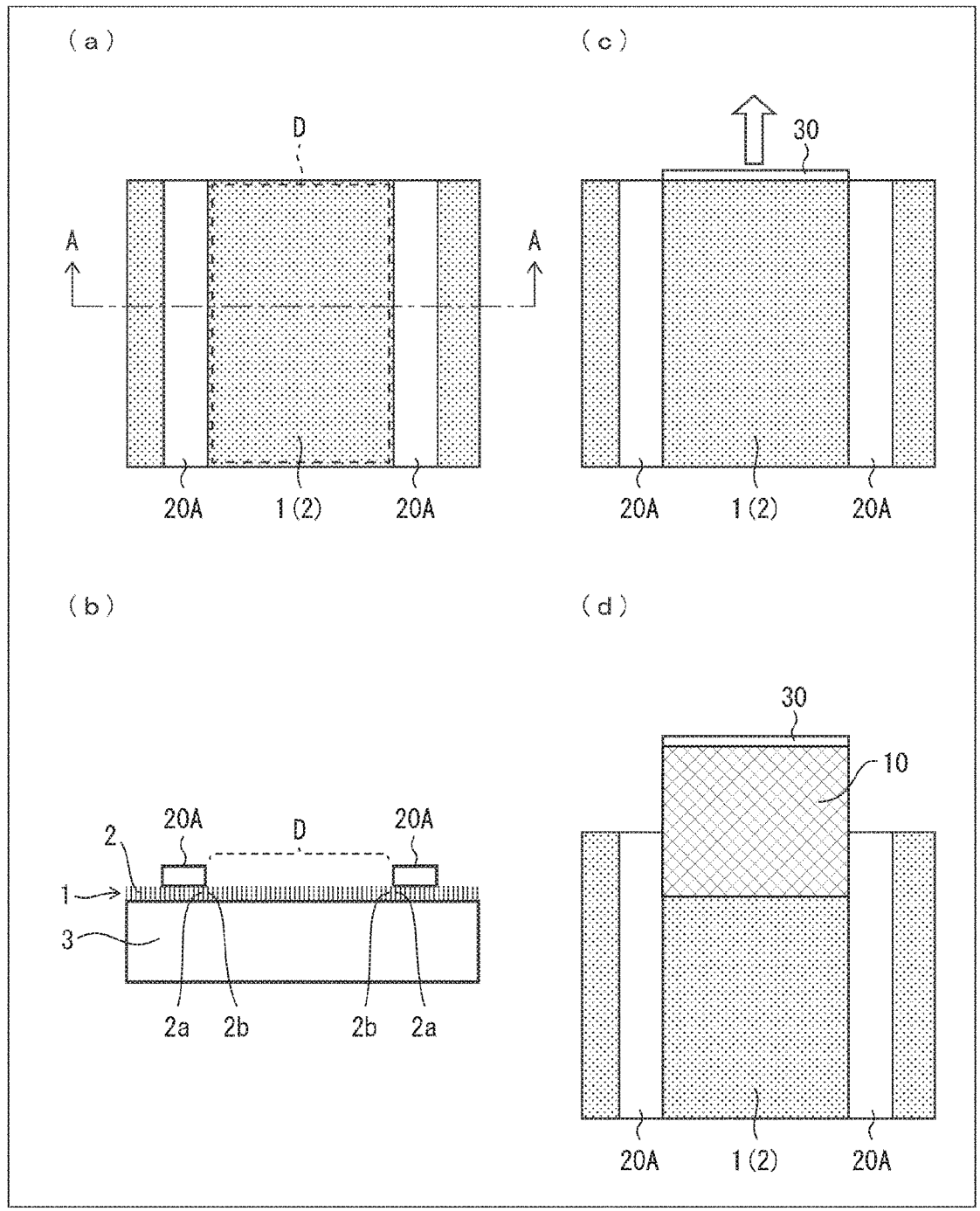
FIG. 2 is a view for explaining a drawing method for drawing out a carbon nanotube web in accordance with an embodiment of the present invention. (a) of FIG. 2 is a plan view illustrating a state in which abutting members are provided on a carbon nanotube array so as to fix carbon nanotubes on both sides of carbon nanotubes to be drawn out as the carbon nanotube web. (b) of FIG. 2 is a cross-sectional view taken along the line A-A in (a) of FIG. 2. (c) of FIG. 2 is a plan view illustrating a state in which the carbon nanotube web has begun to be drawn out from the carbon nanotube array. (d) of FIG. 2 is a plan view illustrating a state in which the carbon nanotube web is drawn out from the carbon nanotube array.

The following description will discuss a method for drawing out a CNT web 10 in accordance with the present embodiment, with reference to FIG. 2. FIG. 2 is a view for explaining a drawing method for drawing out the CNT web 10 in accordance with the present embodiment. (a) of FIG. 2 is a plan view illustrating a state in which abutting members 20A are provided on the CNT array 1 so as to fix CNTs 2a on both sides of CNTs 2 to be drawn out as the CNT web 10. (b) of FIG. 2 is a cross-sectional view taken along the line A-A in (a) of FIG. 2. (c) of FIG. 2 is a plan view illustrating a state in which CNTs 2 have begun to be drawn out from the CNT array 1. (d) of FIG. 2 is a plan view illustrating a state in which the CNT web 10 is drawn out from the CNT array 1.

Note that a direction (i.e., an up-down direction in (c) of FIG. 2) in which the CNT web 10 is drawn out from the CNT array 1 is referred to as "drawing direction", and a direction (i.e., a left-right direction in (b) or (c) of FIG. 2) which is perpendicular to the drawing direction is referred to as "width direction".

In the drawing method for drawing out the CNT web 10 in accordance with the present embodiment, as illustrated in (a) and (b) of FIG. 2, abutting members 20A are provided on respective outer sides of both edges in the width direction of a region D (which is in the CNT array 1 and is surrounded by dashed lines in (a) of FIG. 2) from which the CNT web 10 is to be drawn out. In this case, the abutting members 20A are provided so as to abut on the CNT array 1 from a side opposite to the substrate 3. From this, a load is applied between each of the abutting members 20A and CNTs 2a abutting on the abutting member 20A, and thus the CNTs 2a are fixed to the abutting members 20A.

Each of the abutting members 20A is not limited to a specific one, provided that a load is applied between the abutting member 20A and the CNTs 2. For example, the abutting member 20A can be a long and thin plate-like member. Note that it is preferable that each of the abutting members 20A is an adhesive member (e.g., an adhesive tape) having a surface with adhesiveness, and the abutting member 20A is configured such that an adhesive surface of the adhesive member is attached to the CNTs 2. According to the configuration, the CNTs 2a which exist on the respective outer sides of the both edges of the region D to be drawn are fixed by adhesive force of the adhesive members, as well as by the load, and therefore the CNTs 2a are further firmly fixed by the adhesive members.

Next, as illustrated in (c) of FIG. 2, a bundle of a certain amount of CNTs 2 which exist at an edge in the drawing direction of the region D to be drawn out is attached to a pulling member 30 of a pulling device. Then, the pulling member 30 is moved in the drawing direction so as to be away from the substrate 3 (i.e., in a direction indicated by the arrow in (c) of FIG. 2). From this, the bundle of CNTs 2 attached to the pulling member 30 is detached from the substrate 3, and is thus drawn out from the CNT array 1. Here, as the pulling member 30, a long and thin cylindrical member having a length identical with a length of the region D in the width direction is used. Note, however, that the pulling member 30 is not limited to this member, provided that the pulling member 30 is a member having a surface or a side which extends in the width direction of the region D and whose length is equal to or greater than the length of the region D in the width direction.

Furthermore, in a case where the pulling member 30 is moved so as to be away from the substrate 3, CNTs 2 are drawn out from the CNT array 1 one after another by van der Waals forces applied between the drawn-out CNTs 2 and other CNTs 2 existing in the CNT array 1 (see (d) of FIG. 2). As such, a CNT web 10 is formed, and the CNT web 10 thus formed is drawn out.

Here, the conventional method for drawing out CNTs described in the above section of Background Art has the foregoing problem that edge scraps occurring due to irradiation with a laser beam are mixed in the CNT web.

On the other hand, according to the drawing method in accordance with the present embodiment, irradiation of a laser beam is not carried out but the abutting members 20A are provided, and the CNTs 2a are fixed to the abutting members 20A. As a result, the CNT web 10 can be drawn out without occurrence of edge scraps. This mechanism seems to be achieved for the following reason: that is, (i) the CNTs 2a abutting on the abutting members 20A are firmly fixed to the abutting members 20A by loads of the abutting members 20A applied between the CNTs 2a and the abutting members 20A or by adhesive force of the double-faced tape and (ii) CNTs 2b which do not abut on the abutting members 20A and are located on an inner side are normally drawn out because the degree of connection with other parts of the CNT array 1 is not disturbed. From this, it is possible to draw out, as the CNT web 10, only CNTs 2 which exist in the region D from which the CNT web 10 is to be drawn out, that is, it is possible to draw out a uniform CNT web 10.

Here, as a technique to define the width of the region D from which the CNT web 10 is to be drawn out, any of the following techniques may be employed: that is, a technique in which a CNT array having a width identical with that of the region D is formed in advance; and a technique in which a CNT array having a greater width is formed once and then CNTs are partially removed so that the CNT array has a width identical with that of the region D (hereinafter, those techniques are collectively referred to as "comparative technique"). However, the inventors of the present invention have found that another problem occurs in a case where a CNT web is drawn out from the CNT array in which the width of the region D is thus defined.

In a case where a CNT web is drawn out from the CNT array in which the width of the region D has been defined by the comparative technique, a boundary line between the CNT array and the CNT web is, at the beginning, a substantially straight line extending in the width direction. However, the straight line cannot be maintained as the drawing out of the CNT web continues. Specifically, a drawing speed of the CNT web becomes higher at both edges in the width direction of the boundary line, as compared with a central part in the width direction of the boundary line. Therefore, as the drawing of the CNT web goes on, the boundary line comes to form a mountain-like shape (see the later described Comparative Example and (b) of FIG. 7). This seems to be because CNTs located at the both edges in the width direction of the boundary line are drawn out more easily than CNTs which are located in the central part in the width direction of the boundary line.

In a case where the boundary line forms the mountain-like shape, CNTs remaining in the central part are sometimes drawn out as a lump when the CNT web is drawn out. In this case, the CNT web thus drawn out becomes nonuniform.

On the other hand, the inventors of the present invention have found the following fact: that is, in a case where the CNT web 10 is drawn out from the CNT array 1 in which the width of the region D has been defined by providing the abutting members 20A so that the CNTs 2a are fixed to the abutting members 20A, the boundary line between the CNT array 1 and the CNT web 10 is constantly maintained substantially straight in the width direction (see the later described Example and (a) of FIG. 7). This seems to be achieved for the following reason: that is, in a case where the CNT web 10 is drawn out, some sort of force (such the loads of the abutting members 20A or frictional force caused by the adhesive force of the double-faced tape or the like) is applied between the CNTs 2b existing at both edges in the width direction of the boundary line and the CNTs 2a fixed to the abutting members 20A, and therefore CNTs 2 existing at the both edges in the width direction are drawn out with a degree of easiness similar to that for CNTs 2 existing in a central part in the width direction.

Drawing Method (2) for Drawing Out CNT Web

Figure 3:
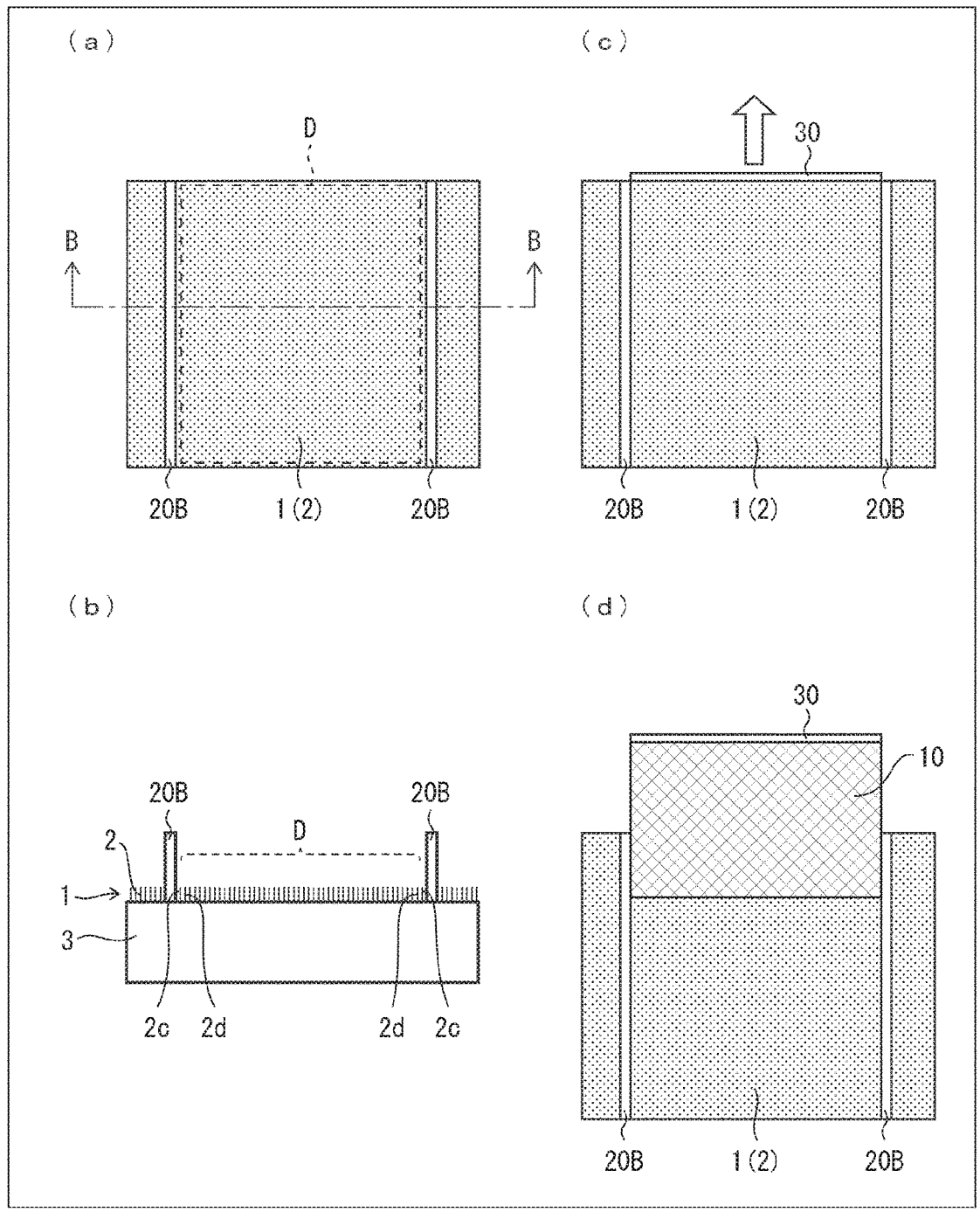
FIG. 3 is a view for explaining a drawing method for drawing out a carbon nanotube web in accordance with another embodiment of the present invention. (a) of FIG. 3 is a plan view illustrating a state in which abutting members are provided so as to abut on both lateral surfaces of the carbon nanotube array at edges of a region to be drawn out as the carbon nanotube web. (b) of FIG. 3 is a cross-sectional view taken along the line B-B in (a) of FIG. 3. (c) of FIG. 3 is a plan view illustrating a state in which carbon nanotubes have begun to be drawn out from the carbon nanotube array. (d) of FIG. 3 is a plan view illustrating a state in which the carbon nanotube web is drawn out from the carbon nanotube array.

The following description will discuss another method for drawing out the CNT web 10 in accordance with the present embodiment, with reference to FIG. 3. FIG. 3 is a view for explaining a drawing method for drawing out the CNT web 10 in accordance with the present embodiment. (a) of FIG. 3 is a plan view illustrating a state in which abutting members 20B are provided so as to abut on both lateral surfaces of the CNT array 1 at both edges of a region D from which the CNT web 10 is to be drawn out. (b) of FIG. 3 is a cross-sectional view taken along the line B-B in (a) of FIG. 3. (c) of FIG. 3 is a plan view illustrating a state in which CNTs 2 have begun to be drawn out from the CNT array 1. (d) of FIG. 3 is a plan view illustrating a state in which the CNT web 10 is drawn out from the CNT array 1.

In the drawing method for drawing out the CNT web 10 in accordance with the present embodiment, abutting members 20B are provided so as to abut on both lateral surfaces at both edges of a region D (which is in the CNT array 1 and is surrounded by dashed lines in (a) of FIG. 3) from which the CNT web 10 is to be drawn out (see (a) and (b) of FIG. 3). According to the arrangement, frictional force is applied between the abutting members 20B and CNTs 2c (existing at both edges of the region D) which are abutting on the abutting members 20B, and thereby the CNTs 2c are fixed to the abutting members 20B.

Next, as illustrated in (c) of FIG. 3, a bundle of a certain amount of CNTs 2 which exist at an edge in the drawing direction of the region D to be drawn out is attached to a tip of a pulling member 30 of a pulling device. Then, the pulling member 30 is moved in the drawing direction so as to be away from the substrate 3 (i.e., in a direction indicated by the arrow in (c) of FIG. 3). From this, the bundle of CNTs 2 attached to the pulling member 30 is detached from the substrate 3, and the CNT web 10 is thus drawn out from the CNT array 1.

Furthermore, in a case where the pulling member 30 is moved so as to be away from the substrate 3, CNTs 2 are drawn out from the CNT array 1 one after another by van der Waals forces applied between the drawn-out CNTs 2 and other CNTs 2 existing in the CNT array 1 (see (d) of FIG. 3). As such, a CNT web 10 is formed, and the CNT web 10 thus formed is drawn out.

Here, in the drawing method in accordance with the present embodiment, as above described, the abutting members 20B are provided so as to abut on both lateral surfaces at both edges of the region D in the CNT array 1 from which region D the CNT web 10 is to be drawn out. According to the arrangement, CNTs 2 existing on the respective outer sides of the both edges of the region D from which the CNT web 10 is to be drawn out are squashed and being pressed down by the abutting members 20B. Moreover, the CNTs 2c abutting on lateral surfaces of the abutting members 20B on the region D side are firmly fixed to the abutting members 20B by the frictional force applied between the CNTs 2c and the abutting members 20B.

Therefore, when the CNT web 10 is drawn out from the CNT array 1, CNTs 2 pressed down by the abutting members 20B and the CNTs 2c abutting on the lateral surfaces of the abutting members 20B on the region D side will not be drawn out. From this, it is possible to draw out, as the CNT web 10, only CNTs 2 which exist in the region D from which the CNT web 10 is to be drawn out (i.e., only CNTs 2 existing on inner sides of the CNTs 2c which are abutting on the lateral surfaces of the abutting members 20B on the region D side), that is, it is possible to draw out a uniform CNT web 10.

According to the drawing method in accordance with the present embodiment also, it is possible to maintain straightness of the boundary line between the CNT array 1 and the CNT web 10, as with the above described "drawing method (1)". This may be achieved for the following reason.

That is, in the drawing method in accordance with the present embodiment, the abutting members 20B are provided so as to abut on the both lateral surfaces at the both edges of the region D from which the CNT web 10 is to be drawn out. According to the arrangement, frictional force is applied between the abutting members 20B and the CNTs 2c existing at the both edges of the region D from which the CNT web 10 is to be drawn out, and thereby the CNTs 2c existing at the both edges of the region D from which the CNT web 10 is to be drawn out are fixed to the abutting members 20B. As a result, when the CNT web 10 is drawn out from the CNT array 1, some sort of force like frictional force is applied between (i) the CNTs 2c which are fixed to the abutting members 20B and exist at the both edges of the region D and (ii) CNTs 2d which are adjacent to the CNTs 2c. From this, the CNTs 2d, which are adjacent to the CNTs 2c that are fixed to the abutting members 20B and exist at the both edges of the region D, may be drawn out with a degree of easiness similar to that for CNTs 2 existing in a central part in the width direction of the boundary line.

Each of the abutting members 20B is not limited to a particular one, provided that frictional force is applied between the abutting member 20B and the CNTs 2 and the abutting member 20B can be inserted into the CNT array 1 from a side opposite to the substrate 3. For example, the abutting member 20B can be a cutting blade. Moreover, it is possible to attach an adhesive member to each of the abutting members 20B. In such a case, the CNTs 2c can be more firmly fixed to the abutting members 20B.

Figure 4:
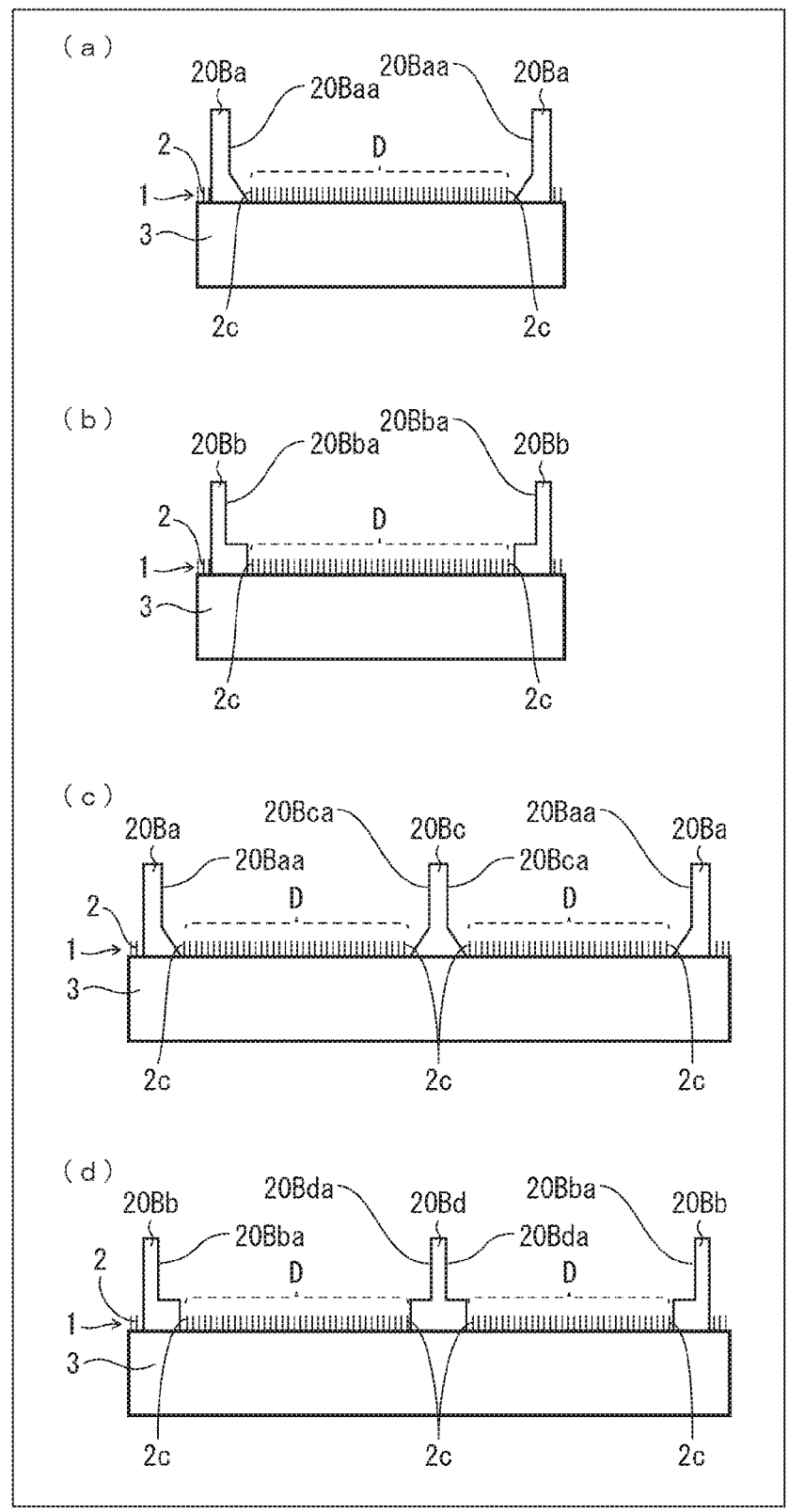
FIG. 4 is a cross-sectional view illustrating, in (a) through (d), shapes of abutting members in modification examples of the drawing method in accordance with another embodiment of the present invention.

Next, the following description will discuss, with reference to FIG. 4, a modification example of the abutting members 20B which are used in the drawing method (2) for drawing out the CNT web. FIG. 4 is a cross-sectional view illustrating, in (a) through (d), shapes of abutting members in modification examples of the drawing method (2) for drawing out the CNT web.

In the drawing method illustrated in FIG. 3 for drawing out the CNT web 10 with use of the abutting members 20B, a surface of each of the abutting members 20B which surface faces the CNT array 1 is a flat plane, and therefore a distance is short between the abutting member 20B and the CNT web 10 which has been drawn out by being inclined in the upward direction with respect to the substrate 3. According to the arrangement, there is a possibility that the CNT web 10 which has been drawn out adheres to the abutting members 20B by electrostatic force, and therefore the CNT web 10 cannot be properly drawn out.

In view of this, abutting members 20Ba in accordance with a modification example respectively have inner surfaces 20Baa which respectively face both lateral surfaces at both edges of the region D from which the CNT web 10 is to be drawn out, and a distance between the two inner surfaces 20Baa is greater in an area above an abutting area than in the abutting area in which the abutting members 20Ba abut on the CNT array 1 (specifically, on the CNTs 2c existing at the both edges of the region D) (see (a) of FIG. 4). More specifically, the distance between the two inner surfaces 20Baa becomes greater as a distance from a part abutting on the substrate 3 increases in the upward direction. In other words, the inner surfaces 20Baa of the respective abutting members 20Ba, which are provided on the both outer sides of the boundary region between the CNT array 1 and the CNT web 10, respectively face the both edges of the boundary region, and the distance between the inner surfaces 20Baa is greater in an area above an abutting area than in the abutting area in which the abutting members 20Ba abut on the CNT array 1 (specifically, on the CNTs 2c existing at the both edges of the region D). According to the arrangement, it is possible to increase the distance between the CNT web 10 which has been drawn out and each of the abutting members 20Ba. As a result, it is possible to inhibit the drawn CNT web 10 from adhering to the abutting members 20Ba (more specifically, to the inner surfaces 20Baa) due to electrostatic force, and this makes it possible to properly draw out the CNT web 10. Note that the abutting members 20Ba can be grounded.

Alternatively, as another modification example, it is possible to use abutting members 20Bb. In each of the abutting members 20Bb, a step is provided in an inner surface 20Bba which faces the lateral surface at the edge of the region D. In this case, the step is provided between a portion of the inner surface 20Bba which portion abuts on the CNT array 1 (specifically, on the CNT 2c existing at the edge of the region D) and a portion of the inner surface 20Bba which portion does not abut on the CNT array 1 (see (b) of FIG. 4). According to the configuration, a distance between the inner surfaces 20Bba of the abutting members is greater in an area above an abutting area than in the abutting area in which the abutting members abut on the CNT array 1 (specifically, on the CNTs 2c existing at the both edges of the region D). In other words, the inner surfaces 20Bba of the respective abutting members 20Bb, which are provided on the both outer sides of the boundary region, respectively face the both edges of the boundary region, and the distance between the inner surfaces 20Bba is greater in an area above an abutting area than in the abutting area in which the abutting members 20Bb abut on the CNT array 1 (specifically, on the CNTs 2c existing at the both edges of the region D). As a result, it is possible to inhibit the drawn CNT web 10 from adhering to the abutting members 20Bb due to electrostatic force, and this makes it possible to properly draw out the CNT web 10.

In a case where CNT webs 10 are respectively drawn out from a plurality of regions D in the CNT array 1, it is possible to provide abutting members 20Bc or 20Bd between the plurality of regions D as illustrated in (c) and (d) of FIG. 4. An abutting member 20Bc (or 20Bd) is configured to have both surfaces 20Bca (or 20Bda) in each of which a portion which does not abut on a CNT 2 located at an edge of the region D is depressed with respect to the region D, as compared to another portion which abuts on the CNT 2 in the region D. According to the configuration, in each of the regions D, a distance between the inner surface 20Baa of the abutting member 20Ba and the surface 20Bca of the abutting member 20Bc (or a distance between the inner surface 20Bba of the abutting member 20Bb and the surface 20Bda of the abutting member 20Bd) is greater in an area above an abutting area than in the abutting area in which the abutting members abut on the CNT array 1 (specifically, on the CNTs 2c existing at the both edges of the region D). As a result, when the CNT webs 10 are drawn out from the respective regions D, it is possible to inhibit the drawn CNT webs 10 from adhering to the abutting members due to electrostatic force, and this makes it possible to properly draw out the CNT webs 10.

(a) through (d) of FIG. 4 illustrate cross sections of the abutting members 20Ba through 20Bd which are taken along a plane perpendicular to the long-axis direction of the abutting members 20Ba through 20Bd (i.e., to the drawing direction of the CNT web 10). Hereinafter a surface of the substrate 3 on which surface the CNT array 1 is provided is referred to as "upper surface". Moreover, a direction which is along the upper surface and is perpendicular to the long-axis direction of the abutting members 20Ba through 20Bd is referred to as "width direction". In the cross section of each of the abutting members 20Ba through 20Bd, a length in the width direction of an edge of the abutting member which edge is abutting on the substrate 3 (e.g., a distance between the inner surfaces 20Baa in (a) of FIG. 4) is greater than a length in the width direction of another portion (located above that edge). According to the configuration, the edges of the abutting members 20Ba through 20Bd which edges are abutting on the substrate 3 abut on the CNTs 2c existing at the both edges of the region D to be drawn out, and the other portions of the abutting members 20Ba through 20Bd do not abut on the CNTs 2c. As a result, it is possible to inhibit the drawn CNT webs 10 from adhering to the abutting members 20Bb through 20Bd due to electrostatic force, and this makes it possible to properly draw out the CNT web 10.

A shape of a cross section of each of the abutting members 20Ba through 20Bd in parallel with the drawing direction of the CNT web 10 is not limited to a particular one, provided that the distance between inner surfaces facing the respective lateral surfaces at the both edges of the region D from which the CNT web 10 is to be drawn out is greater in the area above the abutting area than in the abutting area in which each of the abutting members 20Ba through 20Bd abuts on the CNTs 2c. That is, a shape of the cross section of each of the abutting members 20Ba through 20Bd which is taken along a plane that is perpendicular to the upper surface of the substrate 3 and is parallel to the drawing direction of the CNT web 10 can be a triangular shape, a rectangular shape, or another shape.

As above described in the drawing methods (1) and (2) for drawing out the CNT web, the method for drawing out the CNT web in accordance with an aspect of the present invention includes drawing the CNT web 10 out from the CNT array 1 in a state in which abutting members which abut on the CNT array 1 are provided on respective outer sides of both edges of a boundary region between the CNT array 1 and the CNT web 10.

With the feature, it is possible to inhibit occurrence of edge scraps at the both edges of the boundary region between the CNT array 1 and the CNT web 10, and also inhibit generated edge scraps from being mixed in the CNT web 10. This makes it possible to draw out a further uniform CNT web 10.

Further, with the feature, it is possible to draw out the CNT web 10 in a state in which the boundary line between the CNT array 1 and the CNT web 10 is maintained substantially straight. As a result, it is possible to draw out a further uniform CNT web 10.

Note that, in the drawing methods (1) and (2) for drawing out the CNT web, the abutting members 20A and the abutting members 20B are configured to abut on the CNT array 1 entirely at the both edges of the region D from which the CNT web 10 is to be drawn out. However, the drawing method in accordance with an aspect of the present invention is not limited to this. That is, it is only necessary that the abutting members abut on the both edges of the boundary between the CNT array 1 and the CNT web 10 which is being drawn out, and it is possible to employ a configuration in which the abutting members are moved in accordance with shift of the boundary that occurs as the drawing-out of the CNT web 10 continues.

Drawing Device that Draws Out CNT Web

Figure 5:
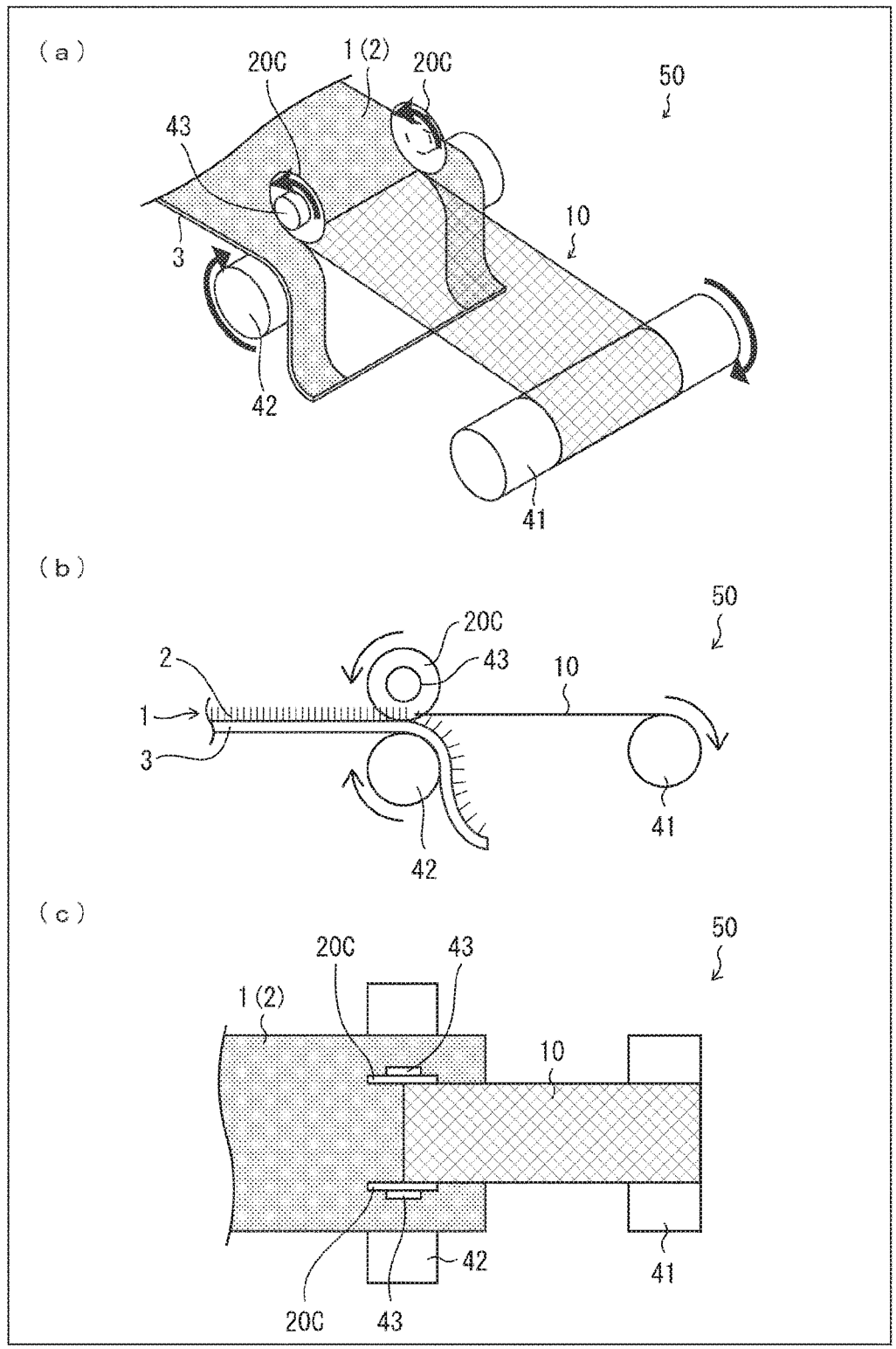
FIG. 5 is a view illustrating a configuration of a drawing device that draws out a carbon nanotube web in accordance with an embodiment of the present invention. (a) of FIG. 5 is a perspective view illustrating the drawing device, (b) of FIG. 5 is a lateral view illustrating the drawing device, and (c) of FIG. 5 is a plan view illustrating the drawing device.
Figure 6:
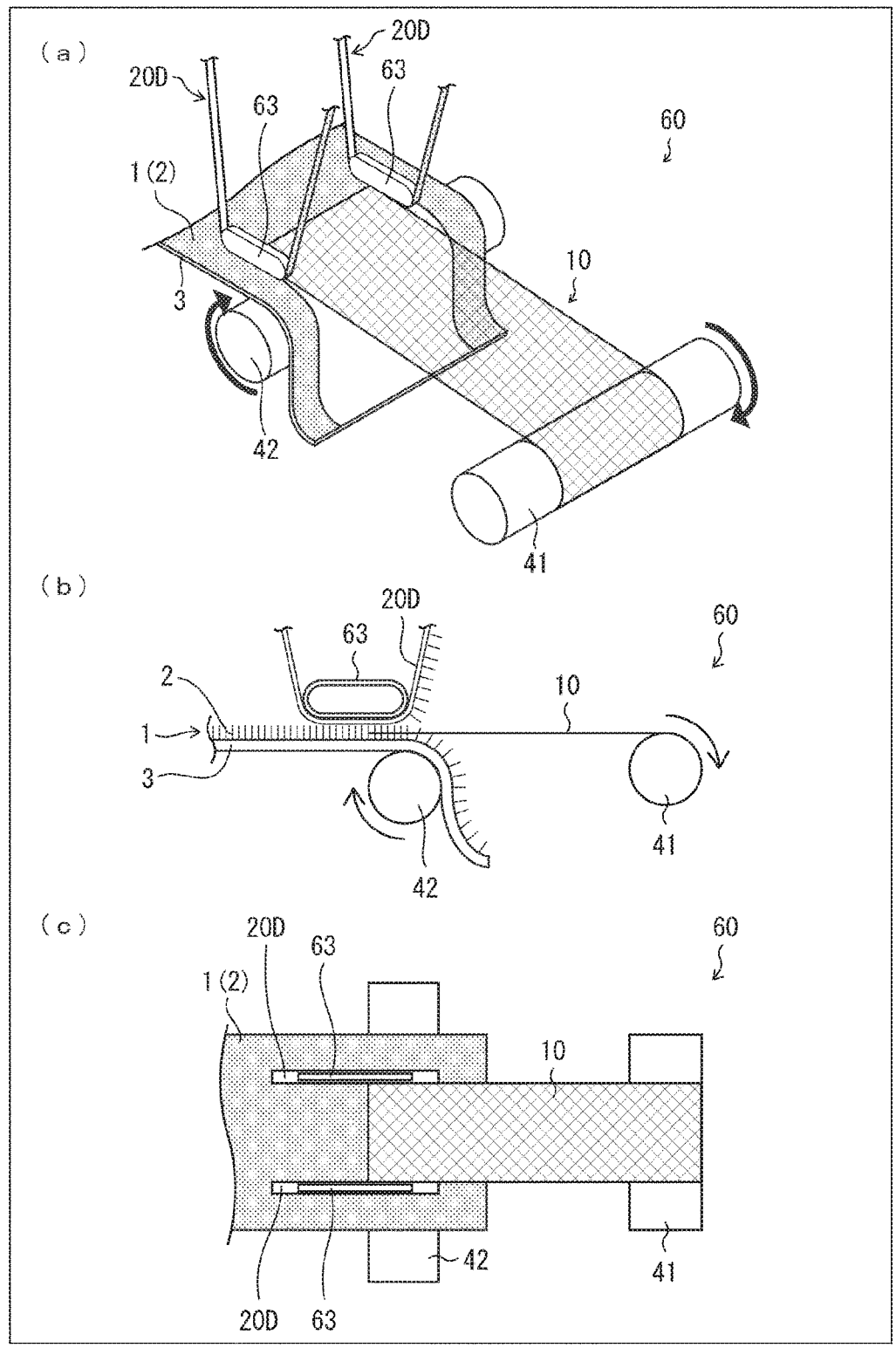
FIG. 6 is a view illustrating a configuration of a drawing device that draws out a carbon nanotube web in accordance with another embodiment of the present invention. (a) of FIG. 6 is a perspective view illustrating the drawing device, (b) of FIG. 6 is a lateral view illustrating the drawing device, and (c) of FIG. 6 is a plan view illustrating the drawing device.

The following description will discuss a drawing device that draws out the CNT web with reference to FIG. 5 and FIG. 6.

Drawing Device 50 for Drawing Out CNT Web

Configuration of Drawing Device 50

The following description will discuss a configuration of a drawing device 50 in accordance with an embodiment of the present invention, with reference to FIG. 5. FIG. 5 is a view illustrating a configuration of the drawing device 50 for drawing out the CNT web 10 in accordance with the present embodiment. (a) of FIG. 5 is a perspective view illustrating the drawing device 50, (b) of FIG. 5 is a lateral view illustrating the drawing device 50, and (c) of FIG. 5 is a plan view illustrating the drawing device 50.

The drawing device 50 includes a substrate conveying section 42 (base material conveying section), a winding section 41, abutting members 20C, and an abutting member rotating section 43 (abutting member conveying section) (see (a) through (c) of FIG. 5).

The substrate conveying section 42 is a cylindrical roller. The substrate conveying section 42 abuts on a surface of the substrate 3 made of a stainless steel sheet from a side opposite to a surface of the substrate 3 on which surface the CNT array 1 is provided. The substrate conveying section 42 rotates in a predetermined direction (in (b) of FIG. 5, in a clockwise direction), and thus conveys the substrate 3 provided with the CNT array 1 in a direction (in (b) and (c) of FIG. 5, toward the right side) in which the CNT web 10 is drawn out.

The winding section 41 is a cylindrical roller. The winding section 41 rotates in a direction identical with that of the substrate conveying section 42 so as to take up the CNT web 10 which has been drawn out, and thus draws the CNT web 10 out from the CNT array 1. That is, the winding section 41 has a function as a pulling section that pulls the CNT web 10 in order to draw the CNT web 10 out from the CNT array 1. Note that the winding section 41 preferably pulls the CNT web 10 while the CNT web 10 is inclined at 0° to 15° with respect to the substrate 3.

Each of the abutting members 20C serving as rotational members is a flat plate having a circular shape, and lower ends of the respective abutting members 20C abut on the surface of the substrate 3 on which surface the CNT array 1 is provided. Further, the abutting members 20C are provided such that circular planes of the respective abutting members 20C abut on lateral surfaces of the CNT array 1 at both edges of the boundary between the CNT array 1 and the CNT web 10. Note, however, that the shape of the abutting members in the drawing device 50 is not limited to the circular shape. For example, each of the abutting members can have an elliptical shape or a round-cornered polygonal shape such as a round-cornered quadrangle.

The abutting member rotating section 43 serving as the abutting member conveying section is a driving section that rotates the abutting members 20C, such that the abutting members 20C are rotated in a direction reverse to that of the substrate conveying section 42.

Operation of Drawing Device 50

The following description will discuss operations of the drawing device 50.

In an operation for drawing out the CNT web 10 with use of the drawing device 50, first, the substrate 3 on which the CNT array 1 has been provided is placed on the substrate conveying section 42 such that a part of the CNT array 1 is located between the two abutting members 20C.

Then, CNTs 2 existing between the two abutting members 20C are drawn out and wound on the winding section 41.

In this state, rotations of the substrate conveying section 42, the abutting members 20C, and the winding section 41 are started. Note that the rotations are controlled such that a peripheral velocity of the substrate conveying section 42 becomes identical with that of the abutting members 20C, and a peripheral velocity of the winding section 41 becomes higher than the peripheral velocity of the substrate conveying section 42 and the abutting members 20C. From this, the CNT web 10 is continuously drawn out from the CNT array 1 and taken up by the winding section 41.

As the CNT web 10 is drawn out from the CNT array 1, the boundary between the CNT array 1 and the CNT web 10 shifts (i.e., goes backward) in a direction opposite to the direction in which the CNT web 10 is drawn out. In view of this, in the drawing device 50, the substrate conveying section 42 is rotated so that the substrate 3 is conveyed in a direction opposite to the direction in which the boundary goes backward, and the abutting members 20C are rotated by the abutting member rotating section 43. From this, the boundary between the CNT array 1 and the CNT web 10 is constantly located substantially directly above the substrate conveying section 42, and flat planes of the abutting members 20C constantly abut on both lateral surfaces of the CNT array 1 on both edge sides of the boundary.

As a result, CNTs 2 existing on the respective outer sides of both edges of the boundary region are squashed and pressed down by the abutting members 20C. Moreover, the CNTs 2 abutting on lateral surfaces of the abutting members 20C on the inner sides are firmly fixed to the abutting members 20C by the frictional force applied between the CNTs 2 and the abutting members 20C.

Therefore, when the CNT web 10 is drawn out from the CNT array 1, the CNTs 2 pressed down by the abutting members 20C and the CNTs 2 abutting on the flat planes of the abutting members 20C will not be drawn out. From this, it is possible to draw out, as the CNT web 10, only CNTs 2 which exist on inner sides of the CNTs 2 which are abutting on the flat planes of the abutting members 20C, that is, it is possible to draw out a uniform CNT web 10.

As above described, the drawing device 50 includes the winding section 41 for taking up the CNT web 10 for drawing the CNT web 10 out from the CNT array 1, and the abutting members 20C whose flat planes abut on the both lateral surfaces of the CNT array 1 on the both edge sides of the boundary region between the CNT array 1 and the CNT web 10. According to the configuration, the CNTs 2 existing at the edges of the boundary region between the CNT array 1 and the CNT web 10 are fixed to the abutting members 20C. From this, it is possible to draw out, as the CNT web 10, only CNTs 2 which exist on inner sides of the CNTs 2 which are abutting on the flat planes of the abutting members 20C. Therefore, it is possible to inhibit occurrence of edge scraps at the edges of the boundary region between the CNT array 1 and the CNT web 10, and also inhibit generated edge scraps from being mixed in the CNT web 10. This makes it possible to draw out a further uniform CNT web 10. Further, it is possible to draw out the CNT web 10 in a state in which the boundary line between the CNT array 1 and the CNT web 10 is maintained substantially straight. As a result, it is possible to draw out a further uniform CNT web 10.

Further, the drawing device 50 includes the substrate conveying section 42 which conveys the substrate 3 in the direction opposite to the direction in which the boundary region goes backward as the CNT web 10 is drawn out, and the abutting member rotating section 43 which rotates the abutting members 20C in accordance with the conveyance of the substrate 3. According to the configuration, the boundary region between the CNT array 1 and the CNT web 10 is constantly located at the same position, and the flat planes of the abutting members 20C can constantly abut on both lateral surfaces of the CNT array 1 on both edge sides of the boundary region. As a result, it is possible to squash and pressed down CNTs 2 existing on the respective outer sides of both edges of the boundary region by the abutting members 20C. Moreover, it is possible to firmly fix the CNTs 2 existing at the both edges of the boundary region to the abutting members 20C by the frictional force applied between the CNTs 2 and the abutting members 20C.

Drawing Device 60 for Drawing Out CNT Web

Configuration of Drawing Device 60

The following description will discuss a configuration of a drawing device 60 in accordance with an embodiment of the present invention, with reference to FIG. 6. FIG. 6 is a view illustrating a configuration of the drawing device 60 for drawing out the CNT web 10 in accordance with the present embodiment. (a) of FIG. 6 is a perspective view illustrating the drawing device 60, (b) of FIG. 6 is a lateral view illustrating the drawing device 60, and (c) of FIG. 6 is a plan view illustrating the drawing device 60. For convenience of explanation, identical reference numerals are given to constituent members having functions identical with those of the drawing device 50, and descriptions of such constituent members are omitted here.

The drawing device 60 includes a substrate conveying section 42, a winding section 41, abutting members 20D, and a tape-like member conveying section 63 (abutting member conveying section) (see (a) through (c) of FIG. 6).

Each of the abutting members 20D is an adhesive member having a surface with adhesiveness, and adhesive surfaces of the abutting members 20D are attached, from a side opposite to the substrate 3, to the CNT array 1 on respective outer sides of both edges of the boundary between the CNT array 1 and the CNT web 10 by the tape-like member conveying section 63 (later described). Note, however, that the abutting members of the drawing device in accordance with the present embodiment are not limited to the adhesive members having surfaces with adhesiveness. That is, the abutting members only need to be tape-like members that can abut on the CNT array 1 from the side opposite to the substrate 3.

The tape-like member conveying section 63 is configured by a belt and serves as a driving section that attaches the adhesive surfaces of the abutting members 20D to the CNT array 1 by rotating in a predetermined direction (in (b) of FIG. 6, in an anticlockwise direction).

Operation of Drawing Device 60

The following description will discuss operations of the drawing device 60.

In an operation for drawing out the CNT web 10 with use of the drawing device 60, first, the substrate 3 provided with the CNT array 1 is placed on the substrate conveying section 42. Then, the adhesive surfaces of the abutting members 20D are attached to the CNT array 1 from a side opposite to the substrate 3. Then, the tape-like member conveying section 63 is provided on surfaces of the abutting members 20D which surfaces are opposite to the adhesive surfaces of the abutting members 20D.

Then, CNTs 2 existing between the two abutting members 20D are drawn out and wound on the winding section 41.

In this state, rotations of the substrate conveying section 42, the tape-like member conveying section 63, and the winding section 41 are started. Note that the rotations are controlled such that a peripheral velocity of the substrate conveying section 42 becomes identical with that of the tape-like member conveying section 63, and a peripheral velocity of the winding section 41 becomes higher than the peripheral velocity of the substrate conveying section 42 and the tape-like member conveying section 63. From this, the CNT web 10 is continuously drawn out from the CNT array 1 and taken up by the winding section 41.

As the CNT web 10 is drawn out from the CNT array 1, the boundary between the CNT array 1 and the CNT web 10 shifts (i.e., goes backward) in a direction opposite to the direction in which the CNT web 10 is drawn out. In view of this, in the drawing device 60, the substrate conveying section 42 is rotated so that the substrate 3 is conveyed in a direction opposite to the direction in which the boundary goes backward, and the abutting members 20D are attached to the CNT array 1 by the tape-like member conveying section 63. From this, the boundary between the CNT array 1 and the CNT web 10 is constantly located substantially directly above the substrate conveying section 42, and the abutting members 20D are attached to CNTs 2 existing on the respective outer sides of the both edges of the boundary between the CNT array 1 and the CNT web 10.

As a result, the CNTs 2 to which the abutting members 20D are being attached are firmly fixed to the abutting members 20D by a load applied between the CNTs 2 and the abutting members 20D and by adhesiveness of the abutting members 20D.

Therefore, when the CNT web 10 is drawn out from the CNT array 1, the CNTs 2 to which the abutting members 20D are being attached will not be drawn out. From this, it is possible to draw out, as the CNT web 10, only CNTs 2 which exist on inner sides of the CNTs 2 to which the abutting members 20D are being attached, that is, it is possible to draw out a uniform CNT web 10.

As above described, the drawing device 60 includes the winding section 41 for taking up the CNT web 10 for drawing the CNT web 10 out from the CNT array 1, and the abutting members 20D which abut, from a side opposite to the substrate 3, on the CNT array 1 on the respective outer sides of the both edges of the boundary region between the CNT array 1 and the CNT web 10. According to the configuration, the CNTs 2 existing on the outer sides of the both edges of the boundary region between the CNT array 1 and the CNT web 10 are fixed to the abutting members 20D. From this, it is possible to draw out, as the CNT web 10, only CNTs 2 which exist on inner sides of the CNTs 2 to which the abutting members 20D are being attached. Therefore, it is possible to inhibit occurrence of edge scraps at the both edges of the boundary region between the CNT array 1 and the CNT web 10, and also inhibit generated edge scraps from being mixed in the CNT web 10. This makes it possible to draw out a further uniform CNT web 10. Further, it is possible to draw out the CNT web 10 in a state in which the boundary line between the CNT array 1 and the CNT web 10 is maintained substantially straight. As a result, it is possible to draw out a further uniform CNT web 10.

Further, the drawing device 60 includes the substrate conveying section 42 which conveys the substrate 3 in the direction opposite to the direction in which the boundary region goes backward as the CNT web is drawn out, and the tape-like member conveying section 63 which causes the abutting members 20D to be attached to the CNT array 1 in accordance with the conveyance of the substrate 3. According to the configuration, the boundary region between the CNT array 1 and the CNT web 10 is constantly located at the same position, and the abutting members 20D can constantly abut on the CNTs 2 existing on the outer sides of the both edges of the boundary region. As a result, it is possible to firmly fix the CNTs 2 existing on the outer sides of the both edges of the boundary region to the abutting members 20D by the load applied between the CNTs 2 and the abutting members 20D.

Manufacture of CNT Yarn

A method for manufacturing a CNT yarn in accordance with an aspect of the present invention includes a drawing step of drawing out a CNT web with the above described drawing method for drawing out the CNT web, and a twining step of twining the CNT web which has been drawn out in the drawing step.

The twining step can be carried out with use of a publicly known twining technique. For example, twining can be carried out by (i) providing, instead of the winding section 41 in the drawing device 50 illustrated in FIG. 5, a spindle which has a rotation axis extending in the drawing direction of the CNT web 10 and moves in the drawing direction and (ii) rotating the spindle while drawing the CNT web 10 out. Alternatively, it is possible to manufacture the CNT yarn by twining a plurality of CNT webs 10 which have been drawn out by the drawing device 50, stacked, and cut to have a predetermined width. The CNT yarn thus manufactured by twining the stacked CNT webs 10 has enhanced strength, as compared with a CNT yarn manufactured by twining one layer of CNT web 10.

The CNT yarn which is manufactured by the manufacturing method in accordance with an aspect of the present invention is made with use of the uniform CNT web which has been drawn out by the drawing step and in which edge scraps are not mixed. Therefore, in the CNT yarn, unevenness in physical properties (e.g., electrical conductivity, heat conductivity, mechanical strength) among different portions of the CNT yarn is restricted, and it is thus possible to manufacture a further uniform CNT yarn.

Manufacture of CNT Sheet

A method for manufacturing a CNT sheet in accordance with an aspect of the present invention includes a drawing step of drawing out a CNT web with the above described drawing method for drawing out the CNT web, and a stacking step of stacking the CNT web which has been drawn out in the drawing step.

The stacking step can be carried out with use of a publicly known stacking technique. For example, the CNT sheet can be manufactured by winding the CNT web which has been drawn out on a roller so as to stack the CNT web.

The CNT sheet which is manufactured by the manufacturing method in accordance with an aspect of the present invention is made with use of the uniform CNT web which has been drawn out by the drawing step and in which edge scraps are not mixed. Therefore, unevenness in physical properties (e.g., electrical conductivity, heat conductivity, mechanical strength) among different portions of the CNT sheet is restricted, and it is thus possible to manufacture a further uniform CNT sheet.

The present invention is not limited to the embodiments described above, but may be altered in various ways by a skilled person within the scope of the claims. Any embodiment based on a proper combination of technical means disclosed in different embodiments is also encompassed in the technical scope of the present invention.

EXAMPLES

The following description will discuss drawing methods in accordance with Example of the present invention and Comparative Example.

In the drawing method in accordance with Example of the present invention, a CNT web was drawn out in a state in which adhesive tapes were attached, from a side opposite to a substrate, to a CNT array (having a width of 3 cm) on respective outer sides of both edges of a region from which the CNT web was to be drawn out.

In the drawing method in accordance with Comparative Example, adhesive tapes were attached, from a side opposite to a substrate, to a CNT array on respective outer sides of both edges of a region from which a CNT web was to be drawn out, and then the CNT web was drawn out in a state in which the adhesive tapes had been detached. Note that, in Comparative Example, when the adhesive tapes were detached, CNTs abutting on the adhesive tapes were accordingly removed from the CNT array.

The following description will discuss, with reference to FIG. 7, states in which the CNT web is being drawn out from the CNT array by the drawing methods of Example of the present invention and Comparative Example. (a) of FIG. 7 is photographs showing a state in which a CNT web is being drawn out from a CNT array with the drawing method in Example of the present invention. (b) of FIG. 7 is photographs showing a state in which a CNT web is being drawn out from a CNT array with the drawing method in Comparative Example.

In the drawing method of Example of the present invention, a boundary line between the CNT array and the CNT web maintained straight (see (a) of FIG. 7), and thus the uniform CNT web could be drawn out.

On the other hand, in the drawing method of Comparative Example, a boundary line between the CNT array and the CNT web changed from a straight line to a mountain-like shape (see (b) of FIG. 7) as the drawing continued. A bundle of CNTs remained in the mountain-like shape was intermittently drawn out, and therefore the CNT web could not be uniformly drawn out.

Recap

The drawing method in accordance with an aspect of the present invention for drawing out a carbon nanotube web is a method for drawing a web of carbon nanotubes out from an array of carbon nanotubes, the method including: drawing the web out from the array in a state in which abutting members which abut on the array are provided on respective outer sides of both edges of a boundary region between the array and the web.

According to the feature, it is possible to fix, to the abutting members, the carbon nanotubes existing on respective outer sides of the both edges of the boundary region between the array and the web or the carbon nanotubes existing at the both edges of the boundary region. As a result, when the carbon nano-web is drawn out, it is possible to inhibit occurrence of edge scraps at the edges of the boundary region between the array and the web, and also inhibit generated edge scraps from being mixed in the web. This makes it possible to draw out a further uniform web.

Further, with the feature, it is possible to draw out the web in a state in which the boundary line between the array and the web is maintained substantially straight. As a result, it is possible to draw out a further uniform web.

Therefore, it is possible to provide the method for further uniformly drawing out a carbon nanotube web while inhibiting mixing of edge scraps.

In the drawing method in accordance with an aspect of the present invention, it is possible that the array is provided on a base material; and the abutting members are provided so as to abut, from a side opposite to the base material, on the array on the respective outer sides of the both edges of the boundary region.

According to the configuration, the abutting members abut, from the side opposite to the base material, on the array on the respective outer sides of the both edges of the boundary region, and this makes it possible to fix, to the abutting members, the carbon nanotubes existing on the respective outer sides of the both edges of the boundary region.

In the drawing method in accordance with an aspect of the present invention, it is preferable that the abutting members are respective adhesive members each of which has a surface with adhesiveness; and adhesive surfaces of the adhesive members are attached to the array on the respective outer sides of the both edges of the boundary region.

According to the configuration, the adhesive surfaces of the abutting members are attached to the array on the respective outer sides of the both edges of the boundary region, and this makes it possible to more firmly fix the carbon nanotubes existing on the respective outer sides of the both edges of the boundary region to the abutting members.

In the drawing method in accordance with an aspect of the present invention, it is possible that the abutting members are provided so as to abut on both lateral surfaces of the array on both edge sides of the boundary region.

According to the configuration, the abutting members are provided so as to abut on the both lateral surfaces of the array on both edge sides of the boundary region, and it is therefore possible to fix, to the abutting members, carbon nanotubes existing at the both edges of the boundary region.

In the drawing method in accordance with an aspect of the present invention, it is preferable that the abutting members located on the both outer sides of the boundary region respectively have inner surfaces which face the respective edges, and a distance between the inner surfaces is greater in an area above an abutting area than in the abutting area in which the abutting members abut on the array.

According to the configuration, it is possible to increase the distance between the web which has been drawn out and each of the abutting members. As a result, it is possible to inhibit the drawn web from adhering to the abutting members due to electrostatic force, and this makes it possible to properly draw out the web.

The method for manufacturing a carbon nanotube yarn in accordance with an aspect of the present invention includes the steps of: drawing out a web of carbon nanotubes with a drawing method described in any one of the above aspects; and twining the web which has been drawn out in the drawing step.

According to the feature, the carbon nanotube yarn is manufactured with use of the uniform web which has been drawn out by any of the above described drawing steps and in which edge scraps are not mixed. Therefore, unevenness in physical properties (e.g., electrical conductivity, heat conductivity, mechanical strength) among different portions of the carbon nanotube yarn is restricted, and it is thus possible to manufacture a further uniform carbon nanotube yarn.

The method for manufacturing a carbon nanotube sheet in accordance with an aspect of the present invention includes the steps of: drawing out a web of carbon nanotubes with a drawing method described in any one of the above aspects; and stacking the web which has been drawn out in the drawing step.

The carbon nanotube sheet is manufactured with use of the uniform web which has been drawn out by any of the above described drawing steps and in which edge scraps are not mixed. Therefore, unevenness in physical properties (e.g., electrical conductivity, heat conductivity, mechanical strength) among different portions of the carbon nanotube sheet is restricted, and it is thus possible to manufacture a further uniform carbon nanotube sheet.

A drawing device that draws out a carbon nanotube web in accordance with an aspect of the present invention is a drawing device that draws a web of carbon nanotubes out from an array of carbon nanotubes, the drawing device including: a pulling section that pulls the web so as to draw the web out from the array; and abutting members which abut on the array on respective outer sides of both edges of a boundary region between the array and the web.

According to the feature, the web is drawn out from the array by the pulling section in a state in which the carbon nanotubes existing on respective outer sides of the both edges of the boundary region between the array and the web or the carbon nanotubes existing at the both edges of the boundary region are fixed to the abutting members. As a result, when the carbon nano-web is drawn out, it is possible to inhibit occurrence of edge scraps at the both edges of the boundary region between the array and the web, and also inhibit generated edge scraps from being mixed in the web. This makes it possible to draw out a further uniform web.

Further, with the feature, it is possible to draw out the web in a state in which the boundary line between the array and the web is maintained substantially straight. As a result, it is possible to draw out a further uniform web.

Therefore, it is possible to provide the device that further uniformly draws out a carbon nanotube web while inhibiting mixing of edge scraps.

The drawing device in accordance with an aspect of the present invention preferably further includes a base material on which the array is provided; a base material conveying section that conveys the base material in a direction opposite to a direction in which the boundary region goes backward as the web is drawn out; and an abutting member conveying section that conveys the abutting members in accordance with conveyance of the base material.

According to the configuration, the boundary region between the array and the web can be constantly located at the same position, and the abutting members can be caused to constantly abut on carbon nanotubes existing on the respective outer sides of the both edges of the boundary region or on lateral surfaces of carbon nanotubes at the both edges of the boundary region. As a result, it is possible to firmly fix, to the abutting members, the carbon nanotubes for which the abutting members constantly exist on the respective outer sides of the both edges of the boundary region or the carbon nanotubes at the both edges of the boundary region.

According to the drawing device in accordance with an aspect of the present invention, it is possible that the abutting members are respective tape-like members that are conveyed by the abutting member conveying section while abutting, from a side opposite to the base material, on the array on respective outer sides of both edges of the boundary region.

According to the configuration, the tape-like members abut, from the side opposite to the base material, on the array on the respective outer sides of the both edges of the boundary region, and this makes it possible to fix, to the tape-like members, the carbon nanotubes existing on the respective outer sides of the both edges of the boundary region.

According to the drawing device in accordance with an aspect of the present invention, it is preferable that the abutting members are respective adhesive members each of which has a surface with adhesiveness; and the abutting member conveying section conveys the adhesive members such that adhesive surfaces of the adhesive members are attached to the array on the respective outer sides of the both edges of the boundary region.

According to the configuration, the adhesive surfaces of the abutting members are attached to the array on the respective outer sides of the both edges of the boundary region, and this makes it possible to more firmly fix the carbon nanotubes existing on the respective outer sides of the both edges of the boundary region to the abutting members.

According to the drawing device in accordance with an aspect of the present invention, it is possible that the abutting members are respective rotational members which are rotated by the abutting member conveying section in a state in which flat planes of the respective rotational members are abutting on both lateral surfaces of the array on both edge sides of the boundary region.

According to the configuration, it is possible to cause the flat planes of the abutting members to abut on the both lateral surfaces of the array on the both edge sides of the boundary region. From this, it is possible to fix, to the rotational members, the carbon nanotubes existing at the both edges of the boundary region.

REFERENCE SIGNS LIST

1: Carbon nanotube array (CNT array)
2, 2a through 2d: Carbon nanotube (CNT)
3: Substrate (base material)
10: Carbon nanotube web (CNT web)
20A through 20D, 20Ba through 20Bd: Abutting member
41: Winding section (pulling section)
42: Substrate conveying section (base material conveying section)
43: Abutting member rotating section (abutting member conveying section)
50, 60: Drawing device
63: Tape-like member conveying section (abutting member conveying section)

The invention claimed is:

1. A method for drawing a web of carbon nanotubes out from an array of carbon nanotubes, in a state in which abutting members which abut on the array are provided on respective outer sides of both edges of a region of the array of carbon nanotubes, the region from which the web is to be drawn out, said method comprising:
fixing, to the abutting members, portions of the array, the portions abutting on the abutting members; and
drawing the web out from an adjacent portion of the array, the adjacent portion being located on an inner side between the abutted portions and does not abut on the abutting members.

2. The method as set forth in claim 1, wherein:
the array is provided on a base material; and
the abutting members are provided so as to abut, from a side opposite to the base material, on the array on the respective outer sides of the both edges of the region.

3. The method as set forth in claim 2, wherein:
the abutting members are respective adhesive members each of which has a surface with adhesiveness; and
adhesive surfaces of the adhesive members are attached to the array on the respective outer sides of the both edges of the region.

4. The method as set forth in claim 1, wherein:
the abutting members are provided so as to abut on both lateral surfaces of the array on both edge sides of the region.

5. The method as set forth in claim 4, wherein:
the abutting members located on the both outer sides of the region respectively have inner surfaces which face the respective edges, and a distance between the inner surfaces is greater in an area above an abutting area than in the abutting area in which the abutting members abut on the array.

6. A method for manufacturing a carbon nanotube sheet, said method comprising the steps of:
drawing out a web of carbon nanotubes with a drawing method recited in claim 1; and
stacking the web which has been drawn out in the drawing step.

* * * * *